United States Patent
Zhang et al.

(10) Patent No.: US 8,945,491 B2
(45) Date of Patent: Feb. 3, 2015

(54) METHOD FOR EXTRACTING VANADIUM FROM SHALE

(71) Applicant: Wuhan University of Technology, Wuhan (CN)

(72) Inventors: Yimin Zhang, Wuhan (CN); Xiaobo Zhu, Wuhan (CN); Tao Liu, Wuhan (CN); Jing Huang, Wuhan (CN); Tiejun Chen, Wuhan (CN); Shenxv Bao, Wuhan (CN)

(73) Assignee: Wuhan University of Technology, Wuhan (CN)

( * ) Notice: Subject to any disclaimer, the term of this patent is extended or adjusted under 35 U.S.C. 154(b) by 0 days.

(21) Appl. No.: 14/010,500

(22) Filed: Aug. 26, 2013

(65) Prior Publication Data

US 2014/0134083 A1    May 15, 2014

(30) Foreign Application Priority Data

Nov. 14, 2012 (CN) .......................... 2012 1 0455607

(51) Int. Cl.
*C22B 34/00* (2006.01)
*C22B 34/22* (2006.01)
*C22B 3/06* (2006.01)
*C22B 3/42* (2006.01)

(52) U.S. Cl.
CPC . *C22B 34/22* (2013.01); *C22B 3/06* (2013.01); *C22B 3/42* (2013.01)
USPC .......................... 423/63; 423/67; 423/594.17

(58) Field of Classification Search
None
See application file for complete search history.

(56) References Cited

U.S. PATENT DOCUMENTS

| | | | | |
|---|---|---|---|---|
| 3,376,105 A | * | 4/1968 | Naumann | 423/63 |
| 3,656,936 A | * | 4/1972 | Haas | 423/63 |
| 4,120,934 A | * | 10/1978 | Mioen | 423/18 |
| 8,277,766 B2 | * | 10/2012 | Hnat et al. | 423/62 |

FOREIGN PATENT DOCUMENTS

CN       102031367       *    4/2011

* cited by examiner

*Primary Examiner* — Steven Bos
(74) *Attorney, Agent, or Firm* — Matthias Scholl P.C.; Matthias Scholl

(57) ABSTRACT

A method for extracting vanadium from shale, the method including: a) grinding the shale into fine powders, mixing the fine powders with an additive in a mass ratio of 1:0.04-0.12 to yield a mixture, heating the mixture to a temperature of between 850 and 950° C. at a heating rate of 5-9° C./min, and baking the mixture for between 30 and 90 min; b) immersing the product in water and acid respectively to yield a first solution and a second solution, combining the two solutions, and performing ion exchange adsorption on the combined solution using a styrene-divinylbenzene based macroporous anion-exchange resin; and c) performing desorption, purification, and precipitation to yield poly ammonium vanadate, and calcining the poly ammonium vanadate at a temperature of between 450 and 530° C. for between 20 and 50 min to yield $V_2O_5$.

9 Claims, 1 Drawing Sheet

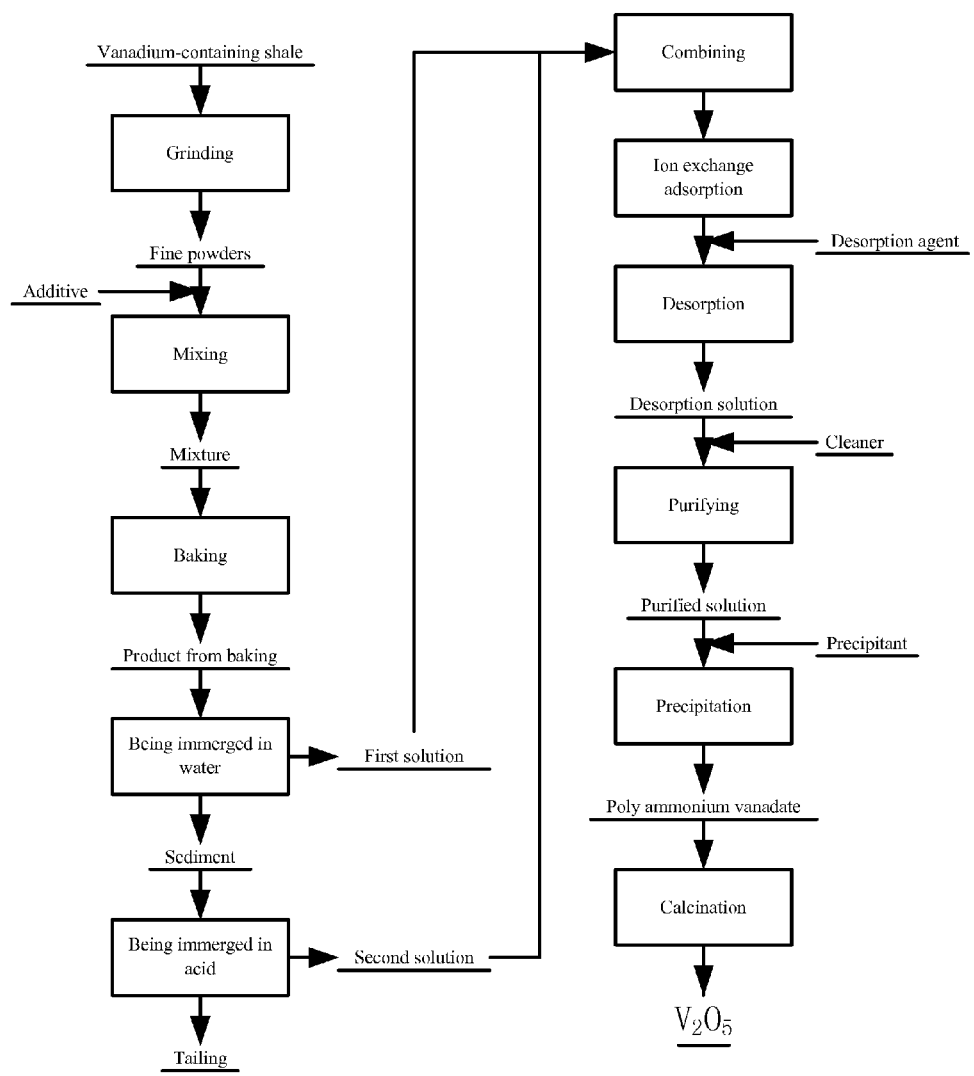

US 8,945,491 B2

METHOD FOR EXTRACTING VANADIUM FROM SHALE

CROSS-REFERENCE TO RELATED APPLICATIONS

Pursuant to 35 U.S.C. §119 and the Paris Convention Treaty, this application claims the benefit of Chinese Patent Application No. 201210455607.X filed Nov. 14, 2012, the contents of which are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to the field of vanadium extraction, and more particularly to a method for extracting vanadium from shale.

2. Description of the Related Art

Vanadium-containing shale is a very important vanadium resource for extraction of vanadium element in the form of $V_2O_5$. Vanadium in the vanadium-containing shale mainly exists in mica crystal structures in an isomorphous state, so that it cannot be directly soluble in water, alkali solution, or any diluted acids except for hydrofluoric acid. In view of such characteristics, high temperature baking and strong acid leaching are generally employed to destroy the mica crystal structure in the vanadium-containing shale for allowing the vanadium in the shale to be soluble in water, acid, or alkali solution and to be transformed into a vanadate for subsequent process.

Typical methods for extracting vanadium from the shale include:

1. Baking Using Sodium Chloride-Water Leaching-Ion Exchange-Vanadium Precipitation by Ammonium Salt The method uses an additive including NaCl and $Na_2CO_3$, and a dosage of the additive exceeds 12 wt. %. A large amount of NaCl results in serious pollution of $Cl_2$ and HCl. Besides, the leaching rate and recovery rate of vanadium is very low.

2. Blank Baking-Alkali Leaching-Extraction-Vanadium Precipitation by Ammonium Salt The method uses a 2 mol/L NaOH solution as a leaching agent and requires high alkali consumption. A resulting leached solution contains a large amount of silicon impurities, which seriously influences the subsequent extraction process.

3. Direct Acid Leaching (or Pressurized Acid Leaching)-Extraction-Vanadium Precipitation by Ammonium Salt The method employs a 4 mol/L sulfuric acid solution as a leaching agent and requires a high acid consumption. Furthermore, a large amount of alkali is necessitated to adjust the pH value so as to meet the requirement of the subsequent extraction process. Process of pressurized acid leaching-extraction for extracting vanadium consumes a large amount of energy, and uses 25-40 wt. % of sulfuric solution as the leaching agent. The process requires high acid consumption, and a resulting acid leached solution includes a high content of impurities, which seriously affects subsequent operations.

SUMMARY OF THE INVENTION

In view of the above-described problems, it is one objective of the invention to provide a method for extracting vanadium from shale that has a simple process and convenient industrialization, and is capable of significantly improving the vanadium leaching rate and recovery rate.

To achieve the above objective, there is provided a method for extracting vanadium from shale, the method comprising the following steps:

a) grinding the shale into fine powders, mixing the fine powders with an additive in a mass ratio of 1:0.04-0.12 to yield a mixture, heating the mixture to a temperature of between 850 and 950° C. at a heating rate of 5-9° C./min, and baking the mixture for between 30 and 90 min;

b) immersing a product resulting from the baking in water to yield a first solution and a sediment, immersing the sediment with an acid to yield a second solution and a tailing, combining the first and the second solutions to yield a combined solution, and performing ion exchange adsorption on the combined solution using a styrene-divinylbenzene based macroporous anion-exchange resin; and c) desorbing the styrene-divinylbenzene based macroporous anion-exchange resin to yield a desorption solution, purifying the desorption solution to yield a purified solution, precipitating the purified solution to yield poly ammonium vanadate, and calcining the poly ammonium vanadate at a temperature of between 450 and 530° C. for between 20 and 50 min to yield vanadium oxide ($V_2O_5$).

In a class of this embodiment, between 60 and 90 wt. % of the fine powders have a particle size not exceeding 0.178 mm.

In a class of this embodiment, the shale is mica-type vanadium-containing shale comprising more than 5 wt. % of calcium oxide.

In a class of this embodiment, the additive is a mixture of $K_2SO_4$, $Na_2SO_4$, and NaCl, and a mass ratio thereof is 1:0.2-0.5:0.1-0.2.

In a class of this embodiment, the immersing in water is carried out under the following conditions: an immersion temperature of between 50 and 90° C., a solid-liquid mass ratio of 1:1.5-2.5, a stirring speed of between 100 and 250 rpm, and a stirring time of between 20 and 40 min.

In a class of this embodiment, the immersing in the acid is carried out under the following conditions: an immersion temperature of between 80 and 95° C., 1-3 v/v. % $H_2SO_4$ being employed and a solid-liquid mass ratio of 1:1-2, a stirring speed of between 100 and 250 rpm, and a stirring time of between 30 and 60 min.

In a class of this embodiment, a desorption agent comprising 3-5 wt. % of NaOH and 8-12 wt. % of NaCl is employed for desorption, and a volume dosage thereof is 1-3 times that of the styrene-divinylbenzene based macroporous anion-exchange resin.

In a class of this embodiment, the desorption solution is purified using an alkaline-soluble calcium salt as a cleaner, and a dosage of the cleaner is between 6 and 18 g per liter of the desorption solution.

In a class of this embodiment, the purified solution is precipitated as follows: at a temperature of between 93 and 99° C., 40 v/v. % $H_2SO_4$ is first added to the purified solution to adjust the pH value thereof to be 2.2-2.5, and then a precipitant comprising an acid-soluble ammonium salt is added to the purified solution for precipitation, a dosage of the precipitant is in accordance with the following ratio: a molar ratio of ammonium ions in the ammonium salt to vanadium ions in the purified solution being 3-6:1.

The additive comprises a small amount of NaCl which facilitates the destruction of the vanadium-containing mica structure, shortens the baking time, and improves the baking effect. Functions of $Na_2SO_4$ and $K_2SO_4$ are as follows: on one hand, $SO_2$ decomposed from a sulfate in the baking process reacts with CaO in the shale to produce $CaSO_4$, thereby inhibiting the production of an anorthite and calcium vanadate; on the other hand, $Na_2O$ and $K_2O$ decomposed from the sulfate easily react with $V_2O_5$, $Al_2O_3$, and $SiO_2$ to produce a K-and-Na-feldspar, sodium vanadate, and potassium vanadate. Because a melting temperature range of the K-and-Na-feldspar is relatively wide, sodium vanadate and potassium vanadate are water soluble and not prone to be wrapped, thereby improving the solubility of vanadium in the water. 1-3 v/v. % $H_2SO_4$ is used to extract a water-insoluble vanadate from the sediment resulting from the water leaching; 72-75% of the water-insoluble vanadate is extracted by $H_2SO_4$, the process of which is easy to control, thereby being easy for industrialization. The combined solution of the first and the second solutions has a pH value exceeding 2, so that the ion exchange can be directly carried out without adding alkali to further adjust the pH value, thereby simplifying the process. An adsorption rate of the vanadate is 98-99 wt. %, a desorption rate of the vanadate is 98-99 wt. %, a precipitation rate of the vanadate is 99-99.8 wt. %, a purity of $V_2O_5$ is 99.12-99.63 wt. %, and a recovery rate of the vanadate is 72-75%.

Thus, the method of the invention is advantageous in its simplified process, convenience for industrialization, largely improved leaching rate and recovery rate of the vanadate.

BRIEF DESCRIPTION OF THE DRAWINGS

The invention is described hereinbelow with reference to accompanying drawings, in which the sole FIGURE is a process flow diagram of a method for extracting vanadium from shale.

DETAILED DESCRIPTION OF THE EMBODIMENTS

For further illustrating the invention, experiments detailing a method for extracting vanadium from shale are described below. It should be noted that the following examples are intended to describe and not to limit the invention.

Raw materials and process parameters were as follows:

Between 60 and 90 wt. % of fine powders had a particle size not exceeding 0.178 mm.

The shale was mica-type vanadium-containing shale comprising more than 5 wt. % of calcium oxide.

An additive was a mixture of $K_2SO_4$, $Na_2SO_4$, and NaCl, and a mass ratio thereof is 1:0.2-0.5:0.1-0.2.

Water leaching was carried out under the following conditions: an immersion temperature of between 50 and 90° C., a solid-liquid mass ratio of 1:1.5-2.5, a stirring speed of between 100 and 250 rpm, and a stirring time of between 20 and 40 min.

Acid leaching was carried out under the following conditions: an immersion temperature of between 80 and 95° C., 1-3 v/v. % $H_2SO_4$ being employed and a solid-liquid mass ratio of 1:1-2, a stirring speed of between 100 and 250 rpm, and a stirring time of between 30 and 60 min.

A desorption agent comprising 3-5 wt. % of NaOH and 8-12 wt. % of NaCl was employed for desorption, and a volume dosage thereof was 1-3 times that of the styrene-divinylbenzene based macroporous anion-exchange resin.

The desorption solution was purified using an alkaline-soluble calcium salt as a cleaner, and a dosage of the cleaner was between 6 and 18 g per liter of the desorption solution.

The purified solution was precipitated as follows: at a temperature of between 93 and 99° C., 40 v/v. % $H_2SO_4$ was first added to the purified solution to adjust the pH value thereof to be 2.2-2.5, and then a precipitant comprising an acid-soluble ammonium salt was added to the purified solution for precipitation, a dosage of the precipitant was in accordance with the following ratio: a molar ratio of ammonium ions in the ammonium salt to vanadium ions in the purified solution being 3-6:1.

Example 1

A method for extracting vanadium from shale. The shale was ground into fine powders. The fine powders were mixed with the additive in a mass ratio of 1:0.04-0.06 to yield a mixture. Thereafter, the mixture was heated to a temperature of between 920 and 950° C. at a heating rate of between 5 and 9° C./min, and baked for between 30 and 50 min.

A product from the baking was immersed in water to produce a first solution and a sediment. The sediment was then immersed in the acid to produce a second solution and a tailing. After that, the first and the second solutions were combined to yield a combined solution. Ion exchange adsorption was performed on the combined solution using a styrene-divinylbenzene based macroporous anion-exchange resin.

The styrene-divinylbenzene based macroporous anion-exchange resin was desorbed to yield a desorption solution. Thereafter, the desorption solution was purified to yield a purified solution. The acid-soluble ammonium salt was added to the purified solution for allowing a poly ammonium vanadate to precipitate. The poly ammonium vanadate was then calcined at a temperature of between 450 and 500° C. for between 20 and 40 min to yield vanadium oxide ($V_2O_5$).

A leaching rate of vanadium was between 75 and 77 wt. %, an adsorption rate of vanadium was between 98 and 99 wt. %, a desorption rate of vanadium was between 98 and 99 wt. %, a precipitation rate of vanadium was between 99 and 99.6 wt. %, and a purity of $V_2O_5$ was between 99.12 and 99.43 wt. %.

Example 2

A method for extracting vanadium from shale. The shale was ground into fine powders. The fine powders were mixed with the additive in a mass ratio of 1:0.06-0.09 to yield a mixture. Thereafter, the mixture was heated to a temperature of between 880 and 920° C. at a heating rate of between 5 and 9° C./min, and baked for between 50 and 70 min.

A product from the baking was immersed in water to produce a first solution and a sediment. The sediment was then immersed in the acid to produce a second solution and a tailing. After that, the first and the second solutions were combined to yield a combined solution. Ion exchange adsorption was performed on the combined solution using a styrene-divinylbenzene based macroporous anion-exchange resin.

The styrene-divinylbenzene based macroporous anion-exchange resin was desorbed to yield a desorption solution. Thereafter, the desorption solution was purified to yield a purified solution. The acid-soluble ammonium salt was added to the purified solution for allowing a poly ammonium vanadate to precipitate. The poly ammonium vanadate was then calcined at a temperature of between 460 and 510° C. for between 30 and 50 min to yield $V_2O_5$.

A leaching rate of vanadium was between 76 and 78 wt. %, an adsorption rate of vanadium was between 98 and 99 wt. %, a desorption rate of vanadium was between 98 and 99 wt. %, a precipitation rate of vanadium was between 99.2 and 99.7 wt. %, and a purity of $V_2O_5$ was between 99.24 and 99.54 wt. %.

Example 3

A method for extracting vanadium from shale. The shale was ground into fine powders. The fine powders were mixed with the additive in a mass ratio of 1:0.09-0.12 to yield a mixture. Thereafter, the mixture was heated to a temperature of between 850 and 880° C. at a heating rate of between 5 and 9° C./min, and baked for between 70 and 90 min.

A product from the baking was immersed in water to produce a first solution and a sediment. The sediment was then immersed in the acid to produce a second solution and a tailing. After that, the first and the second solutions were combined to yield a combined solution. Ion exchange adsorption was performed on the combined solution using a styrene-divinylbenzene based macroporous anion-exchange resin.

The styrene-divinylbenzene based macroporous anion-exchange resin was desorbed to yield a desorption solution. Thereafter, the desorption solution was purified to yield a purified solution. The acid-soluble ammonium salt was added to the purified solution for allowing a poly ammonium vanadate to precipitate. The poly ammonium vanadate was then calcined at a temperature of between 470 and 530° C. for between 25 and 45 min to yield $V_2O_5$.

A leaching rate of vanadium was between 77 and 79 wt. %, an adsorption rate of vanadium was between 98 and 99 wt. %, a desorption rate of vanadium was between 98 and 99 wt. %, a precipitation rate of vanadium was between 99.4 and 99.8 wt. %, and a purity of $V_2O_5$ was between 99.43 and 99.63 wt. %.

The additive comprises a small amount of NaCl which facilitates the destruction of the vanadium-containing mica structure, shortens the baking time, and improves the baking effect. Functions of $Na_2SO_4$ and $K_2SO_4$ are as follows: on one hand, $SO_2$ decomposed from a sulfate in the baking process reacts with CaO in the shale to produce $CaSO_4$, thereby inhibiting the production of an anorthite and calcium vanadate; on the other hand, $Na_2O$ and $K_2O$ decomposed from the sulfate easily react with $V_2O_5$, $Al_2O_3$, and $SiO_2$ to produce a K-and-Na-feldspar, sodium vanadate, and potassium vanadate. Because a melting temperature range of the K-and-Na-feldspar is relatively wide, sodium vanadate and potassium vanadate are water soluble and not prone to be wrapped, thereby improving the solubility of vanadium in the water. 1-3 v/v. % $H_2SO_4$ is used to extract a water-insoluble vanadate from the sediment resulting from the water leaching; 75-79% of the water-insoluble vanadate is extracted by $H_2SO_4$, the process of which is easy to control, thereby being easy industrialization. The combined solution of the first and the second solutions has a pH value exceeding 2, so that the ion exchange can be directly carried out without adding alkali to further adjust the pH value, thereby simplifying the process. An adsorption rate of the vanadate is 98-99 wt. %, a desorption rate of the vanadate is 98-99 wt. %, a precipitation rate of the vanadate is 99-99.8 wt. %, a purity of $V_2O_5$ is 99.12-99.63 wt. %, and a recovery rate of the vanadate is 72-75%.

Thus, the method of the invention is advantageous in its simplified process, convenient industrialization, largely improved leaching rate and recovery rate of the vanadate.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for extracting vanadium from shale, the method comprising the following steps:
    a) grinding the shale into fine powders, mixing the fine powders with an additive in a mass ratio of 1:0.04-0.12 to yield a mixture, heating the mixture to a temperature of between 850 and 950° C. at a heating rate of 5-9° C./min, and baking the mixture for between 30 and 90 min;
    b) immersing a product resulting from the baking in step a) in water to yield a first solution and a sediment, immersing the sediment in an acid to yield a second solution and a tailing, combining the first and the second solutions to yield a combined solution, and performing ion exchange adsorption on the combined solution using a styrene-divinylbenzene based macroporous anion-exchange resin; and
    c) desorbing the styrene-divinylbenzene based macroporous anion-exchange resin to yield a desorption solution, purifying the desorption solution to yield a purified solution, precipitating the purified solution to yield poly ammonium vanadate, and calcining the poly ammonium vanadate at a temperature of between 450 and 530° C. for between 20 and 50 min to yield vanadium oxide ($V_2O_5$).

2. The method of claim 1, wherein between 60 and 90 wt. % of the fine powders have a particle size not exceeding 0.178 mm.

3. The method of claim 1, wherein the shale is mica-type vanadium-containing shale comprising more than 5 wt. % of calcium oxide.

4. The method of claim 1, wherein the additive is a mixture of $K_2SO_4$, $Na_2SO_4$, and NaCl, and a mass ratio thereof is 1:0.2-0.5:0.1-0.2.

5. The method of claim 1, wherein the immersing in water is carried out under the following conditions: an immersion temperature of between 50 and 90° C., a solid-liquid mass ratio of 1:1.5-2.5, a stirring speed of between 100 and 250 rpm, and a stirring time of between 20 and 40 min.

6. The method of claim 1, wherein the immersing in the acid is carried out under the following conditions: an immersion temperature of between 80 and 95° C., 1-3 v/v. % $H_2SO_4$ being employed and a solid-liquid mass ratio of 1:1-2, a stirring speed of between 100 and 250 rpm, and a stirring time of between 30 and 60 min.

7. The method of claim 1, wherein a desorption agent comprising 3-5 wt. % of NaOH and 8-12 wt. % of NaCl is employed for desorption, and a volume dosage thereof is 1-3 times that of the styrene-divinylbenzene based macroporous anion-exchange resin.

8. The method of claim 1, wherein the desorption solution is purified using an alkaline-soluble calcium salt as a cleaner, and a dosage of the cleaner is between 6 and 18 g per liter of the desorption solution.

9. The method of claim 1, wherein the purified solution is precipitated as follows: at a temperature of between 93 and 99° C., 40 v/v. % $H_2SO_4$ is first added to the purified solution to adjust the pH value thereof to be 2.2-2.5, and then a precipitant comprising an acid-soluble ammonium salt is added to the purified solution for precipitation, a dosage of the precipitant is in accordance with the following ratio: a molar ratio of ammonium ions in the ammonium salt to vanadium ions in the purified solution being 3-6:1.

* * * * *